United States Patent [19]
Compadre et al.

[11] Patent Number: 6,039,992
[45] Date of Patent: *Mar. 21, 2000

[54] METHOD FOR THE BROAD SPECTRUM PREVENTION AND REMOVAL OF MICROBIAL CONTAMINATION OF FOOD PRODUCTS BY QUATERNARY AMMONIUM COMPOUNDS

[75] Inventors: Cesar Compadre; Philip Breen; Hamid Salari; E. Kim Fifer, all of Little Rock, Ark.; Danny L. Lattin, Brookings, S. Dak.; Michael Slavik, Springdale, Ark.; Yanbin Li, Fatettville, Ark.; Timothy O'Brien, Little Rock, Ark.

[73] Assignee: University of Arkansas, Little Rock, Ark.

[*] Notice: This patent is subject to a terminal disclaimer.

[21] Appl. No.: 08/840,288

[22] Filed: Apr. 14, 1997

Related U.S. Application Data

[63] Continuation-in-part of application No. 08/631,578, Apr. 12, 1996, Pat. No. 5,855,940.

[51] Int. Cl.[7] .................................................. A01N 43/40
[52] U.S. Cl. ............................................ 426/332; 426/335
[58] Field of Search .................................... 426/332, 335, 426/644, 331, 615, 616, 629, 643, 654

[56] References Cited

U.S. PATENT DOCUMENTS

| | | | |
|---|---|---|---|
| 2,756,647 | 7/1956 | Thompson | 162/161 |
| 5,366,983 | 11/1994 | Lattin et al. | 514/358 |

OTHER PUBLICATIONS

*Microbiology of Foods*, W.H. Freeman and Company, Chapter 6, pp. 123–135(1980).
AN 69(05): C0205 Food Science And Technology Abstracts.
AN 89(11): C0023 Food Science And Technology Abstracts.
AN 1990:426739.
AN 1973: 417711 Caplus Abstracts.
AN 1971:86344 Caplus Abstracts.
AN 1968:43156 Caplus Abstracts.
Mustapha, et al.; "Destruction of Listeria monocytogens by Sodium Hypochlorite and Quaternary Ammonium Sanitizers"; Journal of Food Protection, vol. 52, No. 5, May 1989, pp. 306–311.
Ray, Bibek; "Table of Contents", Fundamental Food Microbiology, 1996.
Wang, et al.; "Bacterial Penetration into Eggs Washed with Various Chemicals and Stored at Different Temperatures and Times"; Journal of Food Protection, vol. 61, No. 3, 1998, pp. 276–279.
Siragusa, G.; "The Effectiveness of Carcass Decontamination Systems for Controlling the Presence of Pathogens on the Surfaces of Meat Animal Carcasses"; HACCP: An Integrated Approach to Assuring the Microbiological Safety of Meat on Poultry, Sheridan, Buchanan, and Montville, 1996, pp. 89–98.
Dorsa, W.; "New and Established Carcass Decontamination Procedures Commonly Used in the Beef–Processing Industry"; Journal of Food Protection, vol. 60, No. 9, 1997, pp. 1146–1151.
Kotula, K. et al.; "Reduction of Aqueous Chlorine by Organic Material"; Journal of Food Protection, vol. 60, No. 3, 1997, pp. 276–282.
Delazari, I. et al.; "Decontaminating Beef for *Escherichia coli* 0157:H7"; Journal of Food Protection, vol. 61, No. 5, 1998, pp. 547–550.
Dalgaard, P. et al.; "Specific Inhibition of Photobacterium phosphoreum Extends the Shelf Lift of Modified–Atmosphere–Packed Cod Fillets"; Journal of Food Protection, vol. 61, No. 9, 1998, pp. 1191–1194.
Fisher, T. et al; "Fate of *Escherichia coli* 0157:H7 in Ground Apples Used in Cider Production"; Journal of Food Protection, vol. 61, No. 10, 1998, pp. 1372–1374.
Wang, W. et al.; "Trisodium Phosphate and Cetylpyridinum Chloride Spraying on Chichen Skin to Reduce Attached *Salmonella typhimurium*"; Journal of Food Protection, vol. 60, No. 8, 1997, pp. 992–994.
Dorsa, W., et al.; "Effects of Acetic Acid, Lactic Acid and Trisodium Phosphate on the Microflora of Refrigerated Beef Carcass Surface Tissue Inoculated with *Escherichia coli* 0157:H7, *Listeria innocua*, and Clostidium sporogenes"; Journal of Food Protection, vol. 60, No. 6, 1997, pp. 619–624.
Dorsa, W., et al.; "Long–Term Effect of Alkaline, Organic Acid, or Hot Water Washes on the Microbial Profile of Refrigerated Beef Contamined with Bacterial Pathogens after Washing"; Journal of Food Protection, vol. 61, No. 3, 1998, pp. 300–306.
Thomas, C.J., et al.; "Factors Which Affect Retention of Salmonella by Chicken Muscle Fascia"; Biofouling, vol. 5 , 1991, pp. 75–87.

(List continued on next page.)

*Primary Examiner*—Peter Chin
*Attorney, Agent, or Firm*—Foley & Lardner

[57] ABSTRACT

A method of using quaternary ammonium compounds for inhibiting attachment of and removing a broad spectrum of foodborne microbial contamination from food products. The method uses quaternary ammonium compounds for inhibiting attachment of and removing microorganisms such as, Staphylococcus, Campylobacter, Arcobacter, Listeria, Aeromonas, Bacillus, Salmonella, non-toxin-producing Escherichia, and pathogenic toxin-producing Escherichia, such as 0157:H7; fungi, such as *Aspergillus flavus* and *Penicillium chrysogenum*; and parasites, such as Entameba histolytica from a broad range of food. The foods that can be treated by this method are meat, seafood, vegetables, and fruit. One of the treatment methods is spraying quaternary ammonium compounds on the food products to prevent broad spectrum foodborne microbial contamination. New formulations of quaternary ammonium compounds combined with glycerin and/or ethyl alcohol provides a concentrated formulation for industrial use and a diluted formulation for use in spraying methods.

26 Claims, 5 Drawing Sheets-

OTHER PUBLICATIONS

Havey, S.C., Antimicrobial Drugs in Remington's *Pharmaceutical Sciences*, 18th Ed., Mack Publishing Co., pp. 1163–1241, 1990.

Somers, E.B. et al., *Int. J. Food Microbiol.*, 22:269–276, 1994.

Breen et al., *J. Food Sciences*, 60:1991–1996, 1995.

Kim et al., *J. Infect. Dis.*, 170:1606–1609, 1994.

Ciosek et al., *Med. Weter.*, 40:335,338:1984. Chem. Abst. 101:187892m.

Salton et al., *Medical Microbiology*, 3rd Ed., Churchill Livinston, pp. 37–54, 1991.

Breen et al., presented at "New Technology to Improve Food Safety" Conference (Apr. 13, 1995).

Slavik et al., in *1993–94 Food Safety Progress Report*, pp. 8–12.

Lattin et al., in *1993–94 Food Safety Research Progress Report*, pp. 66–70.

METHOD FOR THE BROAD SPECTRUM PREVENTION AND REMOVAL OF MICROBIAL CONTAMINATION OF FOOD PRODUCTS BY QUATERNARY AMMONIUM COMPOUNDS

This application is a continuation-in-part of pending U.S. Ser. No. 08/631,578 filed on Apr. 12, 1996, which is herein incorporated by reference in its entirety U.S. Pat. No. 5,855,940.

BACKGROUND OF THE INVENTION

1. Field of Invention

The present invention relates generally to a method of preventing the growth of a broad range of microorganisms on food products. More specifically, the present invention relates to a method of using quaternary ammonium compounds (QACs) for preventing the growth of a broad spectrum of microorganisms on food products; such as, meat products, for example, poultry, beef, pork, lamb, venison, and other edible meat products; seafood, for example, fish and shellfish; fruit, vegetables, and any other food products that can be treated utilizing the aqueous treatment methods of the present invention without detrimentally affecting the appearance, texture, and quality of the food. More specifically, the present invention relates to a method of using QACs to inhibit the attachment of, to remove, and to prevent the growth of microorganisms on food products. Particularly, the use relates to the effect of QACs on microorganisms that can cause foodborne contamination. More particularly, these microorganisms include microorganisms from the genus Staphylococcus, Campylobacter, Arcobacter, Listeria, Aeromonas, Bacillus, Salmonella, non-toxin-producing Escherichia, and pathogenic toxin-producing Escherichia, such as 0157:H7. More particularly, the present invention relates to an improved treatment method of spraying QACs on the food products to prevent broad spectrum microbial growth on these products. The present invention also relates to a formulation of QACs that makes the treatment method more amenable for commercial use in a food processing plant.

2. Description of the Prior Art

Prevention of foodborne illnesses by microbial contamination is of major concern to the food processing industry, regulatory agencies, and consumers. A recent report from the Food Safety & Inspection Service (FSIS) of the United States Department of Agriculture (Federal Register, Feb. 3, 1995) estimates that over 2 million cases of foodborne illnesses are produced annually by microbial contamination in the United States, with an associated cost of over $1 billion. Foodborne microbial contamination occurs both prior to entry into the processing facility, and by cross-contamination in the processing environment. The FSIS has instituted new Hazard Analysis and Critical Control Point (HACCP) requirements to reduce the occurrence and number of foodborne pathogens. These regulations must be met by food processors. Although the means of achieving this microbial reduction is left to the discretion of the processor, FSIS expects that antimicrobial treatments will be an important component of HACCP plans. The treatment methods of the present invention, which employ aqueous formulation of QACs, are useful in meeting the HACCP requirements.

In their efforts to provide a product completely free of microbial contamination, poultry and meat processors have encountered major difficulties in removing microorganisms that adhere or attach vigorously to poultry and meat tissues intended as food products. If contaminating microorganisms do not attach to the surface of the food, they can be easily rinsed off. However, the microorganisms that become strongly attached cannot be removed by rinsing and are quite resistant to removal by chemical or physical means.

Several chemical and physical methods have been proposed to reduce microorganisms in meat products, such as the use of chlorine or chlorine dioxide, ozone, hydrogen peroxide, lactic acid, sodium carbonate, trisodium phosphate, and electrical stimulation. Generally, these methods have shown limited effectiveness in reducing microbial contamination and may affect the physical appearance of the meat products.

*Salmonella typhimurium* contamination has been of special concern to the poultry processing industry because the organism is often present on live birds. Poultry processors have had great difficulty in removing microorganisms, such as *S. typhimurium*, that attach or adhere to poultry tissues. A variety of chemical and physical approaches have been suggested for use during poultry processing to eliminate *S. typhimurium* contamination of carcasses and minimize cross-contamination among carcasses. Trisodium phosphate (TSP) has been utilized in poultry processing for suppressing *S. typhimurium*; however, studies report conflicting results on the efficacy of TSP against Salmonella. As a result of its water solubility, TSP can be washed off of the poultry and thus, cannot inhibit attachment of microorganisms.

U.S. Pat. No. 5,366,983, incorporated herein by reference, discloses a method for removing or preventing Salmonella contamination of meat products by treatment with an effective amount of an aqueous solution of a QAC. Specifically, quaternary ammonium cationic surfactants, such as alkylpyridinium, particularly cetylpyridinium chloride (CPC) and cetylpyridinium bromide (CPB) were effective in removing *S. typhimurium* from poultry. This patent, however, does not disclose that QACs have a broader antimicrobial spectrum against any other genuses of food contaminating microorganisms than Salmonella. Further, it does not suggest that this treatment method would be effective on food products other than meat.

Food substances differ chemically and physically by virtue of their protein content, porosity, lipophilicity, surface pH, water permeability, surface area, and surface net electrical charge. Porosity of food could be important in the sequestration of bacteria whereas a tough, impermeable integument on a food substance could reduce bacterial contamination of the food. All of these chemical and physical differences among food products make it difficult to predict whether one antimicrobial agent's success on meat products would suggest success on other food products, such as fruit, vegetables, and seafood.

For example, CPC is known to bind to proteins; however, if the antimicrobial efficacy of CPC on food products were due in large part to the protein binding then the present method for treating non-proteinaceous fruits and vegetables would not have been expected to be successful.

Increasingly, foodborne illnesses caused by other pathogenic and spoilage bacteria than Salmonella have become a problem for food processors. A list of these bacteria with the products in which they have been identified is presented in Table 1:

TABLE 1

INCIDENCE OF PATHOGENIC AND SPOILAGE BACTERIA

| Microorganism | Poultry | Beef | Pork | Pathogen | Spoilage |
|---|---|---|---|---|---|
| Aeromonas hydraphila | X | X | X | | X |
| Arcobacter butzleri | | X | X | X | |
| Bacillus cereus | X | X | X | X | |
| Campylobacter jejuni | X | X | X | X | |
| Escherichia coli O157:H7 | X | X | X | X | |
| Listeria monocytogenes | X | X | X | X | |
| Salmonella typhimurium | X | X | X | X | |
| Staphylococcus aureus | X | X | X | X | |

Among these contaminating microorganisms listed in the table, *Escherichia coli* 0157:H7 is of special concern because of its virulence, severity of the illness produced, and associated mortality. *E. coli* 0157:H7 produces strong "shiga-like" toxins that lead to blood clotting abnormalities, kidney failure (hemolytic uremic syndrome), and death. Even if recovery from the acute illness is complete, 15–30% of infected people with hemolytic uremic syndrome will have evidence of chronic kidney disease. The risks associated with contamination with *E. coli* 0157:H7 are compounded by its reported resistance to antibiotics. In 1993, between 8,000–16,000 cases of foodborne illnesses were produced by *E. coli* 0157:H7 with an estimated cost of between 0.2 and 0.5 billion dollars.

Another virulent food contaminant, Listeria monocytogenes has been found in meat, vegetables, and various milk products; and may cause sepsis, meningitis, and disseminated abscesses. *L. monocytogenes* is a cold tolerant microorganism capable of growing under refrigeration. In 1993, about 1,700 cases of foodborne illness were produced by *L. monocytogenes* with an estimated cost of between 0.1 and 0.2 billion dollars.

Another microorganism of concern in the food industry is *Aeromonas hydrophila* which causes spoilage in the food and meat processing industry and reduces the shelf life of these products.

Presently, there are no known microbicidal compounds which are effective at preventing and removing contamination in a broad range of food products against a broad spectrum of gram positive, gram negative, aerobic, facultative anaerobic, and microaerophilic microorganisms. The present inventors have determined that QACs are effective against a broad spectrum of different microorganisms which produce foodborne illnesses when they become attached to a broad range of food products. This sensitivity of a broad spectrum of pathogenic microorganisms could not have been predicted.

Sensitivity of a microorganism to a particular antimicrobial agent is not predictive of the sensitivity of other microorganisms to the same agent. It is believed that antiseptics or germicides have a continuous spectrum of activity but the relative susceptibilities of different microorganisms must be considered. For example, the germicide, hexachlorophene is primarily effective against Gram positive microorganisms, and cationic antiseptics are not effective against sporulating organisms. Some Gram negative microorganisms, such as Pseudomonas cepacia, have been known to grow in solutions of the drug, benzalkonium chloride. Other bacteria have been known to be capable of growing in 70% ethanol (Harvey, S. C., *Antimicrobial Drugs* in Remington's *Pharmaceutical Sciences*, 18th Ed., Mack Publishing Co., pp. 1163–1241 1990).

In regard to the treatment of food products, it has been reported that Listeria is more resistant to the action of TSP than Salmonella or *E. coli* (Somers, E.B. et al., *Int. J. Food Microbiol.*, 22:269–276, 1994). Further, (Breen et al., *J. Food Sciences*, 60:1991–1996, 1995) demonstrated that TSP is much less effective in inhibiting Salmonella growth than it is in detaching this organism. Similarly, TSP has reduced the numbers of *E. coli* 0157:H7 on chicken carcasses but is ineffective in inhibiting the cross-contamination of this microorganism to other chickens.

The present invention shows that QACs are effective against *E. coli* 0157:H7 in suspension in liquids, in reducing the numbers of this bacteria when it is attached to food products, as well as in inhibiting the attachment of this bacteria to food products. It has been reported that *E. coli* 0157:H7 shows resistance towards broad spectrum antimicrobial agents, such as tetracycline, streptomycin, sulfisoxazole (Kimet al., *J. Infect. Dis.*, 170:1606–1609, 1994) and oxytetracycline (Ciosek et al., *Med. Weter.* 40:335, 338:1984), whereas these same agents are very active against regular non-toxin-producing strains of *E. coli*.

Clearly the effectiveness of an antimicrobial agent or biocide against a particular microorganism cannot be predicted based upon its effectiveness against a different microorganism. There are many factors to consider, such as microbial characteristics which may play a role in the effectiveness of an antimicrobial agent against a particular microorganism. These characteristics include but are not limited to: (1) the degree of glycocalyx formation by a given species of attached microorganism, (2) the presence of a lipopolysaccharide- and phospholipid-containing cell envelope in gram negative bacteria, (3) the presence of lipoprotein as in most enteric bacteria and Pseudomonas, and (4) the presence of porin protein channels, for example in *E. coli* and Salmonella (Fulton et al., *Structure in Medical Microbiology*, 3rd Ed., pp. 37–54, 1991).

The food processing industry is in need of a more effective process for the prevention of growth of a broad range of contaminating microorganisms on many different food products. This is especially true for microorganisms which are attached to the surfaces of food. As a result of increasing numbers of illnesses caused by foodborne pathogenic microorganisms, the food processing industry now requires more effective processes for the removal and prevention of a broader spectrum of microorganisms, and particularly for pathogenic microorganisms, such as, toxinproducing Escherichia, i.e., *E. coli* 0157:H7, which are known to cause serious human diseases as a result of food contamination. The present inventors have provided a method of preventing the growth of microorganisms in liquids associated with food products, an important goal in preventing cross-contamination inside the processing plant; in removing attached microorganisms from food products, in inhibiting the attachment of microorganisms to the food products; and in preventing the growth of microorganisms that remain attached to the food products. Further, the method of the present invention can easily be adapted for use in a food processing plant.

Additionally, the present invention provides a concentrated QAC formulation for use in dilution to a working solution for use in the present method. A formulation of the present invention contains solubility enhancing components which may also result in longer contact times of the formulation with the food product.

SUMMARY OF THE INVENTION

The present invention provides a method for the prevention of growth of a broad spectrum of microorganisms on food products. The prevention of growth of microorganisms on food products is intended to provide a food product that is devoid of or contains minimal numbers of viable microorganisms that could cause illness in humans or animals or spoilage of the food product prior to ingestion. The prevention of growth of microorganisms on food products is intended to include but is not limited to the following mechanisms: (1) removal of attached microorganisms from the food. products; (2) inhibition of attachment of microorganisms to the food products; (3) killing or inactivation of attached microorganisms on the food products; and (4) killing or inactivation of microorganisms which are not attached to the food product but which are present in liquids associated with the food products during processing; such as in chill tanks.

The microorganisms which are susceptible to QACs include microorganisms from the genus Staphylococcus, Campylobacter, Arcobacter, Listeria, Aeromonas, Bacillus, Salmonella, non-toxin-producing Escherichia, pathogenic toxin-producing Escherichia, and other foodborne microorganisms which are capable of causing microbial foodborne contamination of food for human or animal consumption.

Additional microorganisms which are also susceptible to QACs are fungi, such as, Aspergillus flavum and *Penicillium chrysogenum*, and parasites, such as Entamoeba histolytica.

The composition of the present invention comprises a microbial growth inhibiting effective amount of QAC in an aqueous solution. QACs of the present invention are effective in preventing the growth of a broad spectrum of pathogenic and spoilage microorganisms. QACs, particularly cetylpyridinium chloride (CPC), are especially effective to prevent the growth of a broad spectrum of microorganisms on a broad range of food products.

The present invention has an important application in the food processing industry, as well as for home use. QACs are readily available and the cost of carrying out the method of the present invention is not expensive as compared to existing antimicrobial processes. Unlike existing treatments using, for example, TSP, the use of QACs does not alter the appearance, color, taste, or texture of the food product. A range of concentrations of QACs are effective in preventing broad spectrum microbial growth on food products. QACs are safe as shown by the lack of mutagenicity of CPC using the Ames assay. Further, CPC is already approved for human use in products for oral ingestion in preparations, such as Cepacol® lozenges which are orally ingested in amounts up to 20 mg per day.

The present invention is also directed to a formulation of QAC for use with the present method for the treatment of food products, in which for example, CPC is formulated with solubility enhancing agents, such as ethyl alcohol and/or glycerin.

The present invention also is directed to an improved method of contacting food products with QAC for a period of time of less than five minutes, even as short as 20 to 90 seconds, which results in significant prevention of growth of microorganisms on the food products.

The invention also includes an improved method of contacting QACs with food products by spraying the compound on the food product. The spraying method can be performed using QAC in solution in water or using the new formulation with QAC formulated with solubility enhancing agents.

Further, the method of the present invention can optionally include a determination step prior to contacting the food product with the QACs to determine the presence of microorganisms on the food before treatment. Any conventional methods for rapidly determining the presence of microorganisms can be utilized as the determination step, which for example, includes PRC and immunoassays.

Additionally, the method of the present invention can optionally include a step to determine the presence of QACs on the surface of the food product after contact with the QACs. This determination can be performed immediately after the contacting step or after several washing steps. For example, the QAC can be extracted from the tissues of the food in a form suitable for high performance liquid chromatography (HPLC) analysis. The method comprises ethanol extraction of the food tissue followed by solid-phase extraction using a weak cationic exchange column that selectively separates QACs from other compounds in the matrix that would otherwise interfere with the HPLC analysis. The HPLC assay for quantitation of QAC residues employs a reverse phase cyano column and uses a QAC analog as an internal standard.

DETAILED DESCRIPTION OF THE INVENTION

Figure 1:
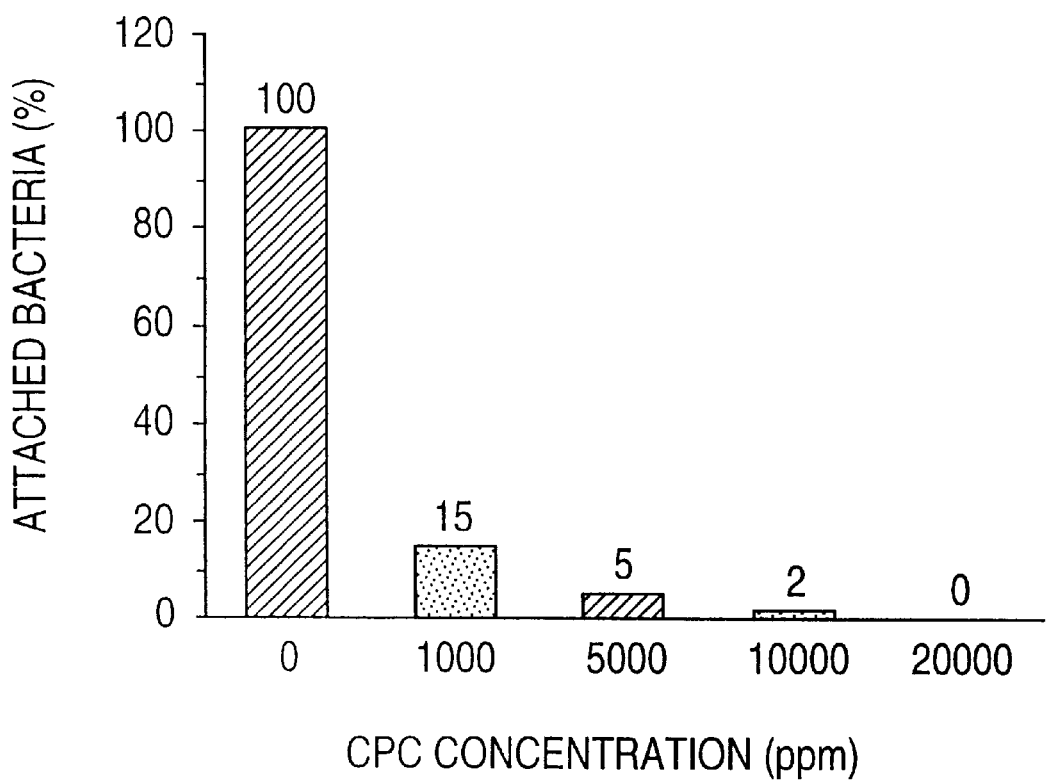
FIG. 1 is a bar graph showing the inhibition of attachment of *E. coli* 0157:H7 to beef flank tissue after treatment with CPC.

The present invention is based upon the determination that QACs can be used to treat a broad range of food products to reduce a broad spectrum of foodborne microbial contamination on these products. The present invention is also based upon the finding that QACs are effective in removing, killing, inactivating and inhibiting the attachment of a broad range of foodborne pathogenic microorganisms to food products. These microorganisms include but are not limited to bacteria belonging to the genuses, Salmonella, Staphylococcus, Campylobacter, Arcobacter, Listeria, Aeromonas, Bacillus, non-toxin-producing Escherichia, and the virulent toxin-producing Escherichia strains, such as *E. coli* 0157:H7; fungi, such as *Aspergillus flavus* and *Penicillium chrysogenum*; and parasites, such as Entamoeba histolytica.

The compositions of the present invention comprise an effective amount of QAC in an aqueous solution. The QAC is selected from the group consisting of alkylpyridinium, tetraalkylammonium and alkylalicyclic ammonium salts.

Alkylpyridinium is represented by the structural formula (I):

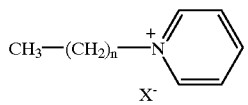

wherein n is 9–21; and X is a halide.

Tetra-alkylammonium is represented by the structural formula (II):

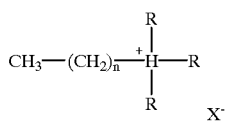

wherein n is 9–21; R is selected from the group consisting of $CH_3$ and $C_2H_5$; and X is a halide.

Alkylalicyclic ammonium salts are represented by the structural formula (III):

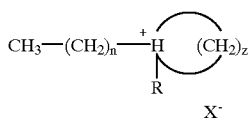

wherein n is 9–21; Z is 4–5; R is selected from the group consisting of $CH_3$ and $C_2H_5$; and X is a halide.

A variety of QACs, all of which are cationic surface active agents; i.e., surfactants, were evaluated for their effectiveness in removing attached microorganisms from various foods as well as in inhibiting the attachment of the microorganisms. Of the QACs studied, cetylpyridinium chloride (CPC) was the most effective and will be utilized in the examples set forth below but it not intended to limit the use of QACs to CPC within the meaning of the present invention because other members of QACs also have similar properties against the foodborne pathogenic microorganisms.

The present invention is further based on the determination that the contact time of QACs with the food products in the immersion process can be reduced to 1 minute yet still result in significant inhibition of microorganism attachment, for foodborne microorganisms including Salmonella, which is a significant improvement and a commercial advantage in the industrial use of this process.

The present invention is also based on the determination that a new method of spraying QACs under various pressures on the food products for 20 to 90 seconds significantly reduces the viable foodborne microorganisms on these products.

The present invention is also based on the determination that a new formulation of QACs in solutions containing varying concentrations of at least one solubility enhancing agents, such as ethyl alcohol or glycerin, is useful for treatment of food products. This is particularly so when the QAC solutions are to be used in combination with salt, are highly concentrated, or will be subject to cold temperatures, such as inside food processing plants. This new formulation allows concentrated QAC to be stored and then easily diluted for use in the antimicrobial treatment process in the processing plant rather than requiring powder QACs to be mixed prior to using. This new formulation of QACs provides an easy to use concentrate which is advantageous for industrial use. This new QAC formulation can be used in both the standard immersion method or the new spraying method.

The above described aspects of the present invention are described in detail below with reference to FIGS. 1–5.

The examples set forth below serve to further illustrate the present invention in its preferred embodiments, and are not intended to limit the present invention. The examples utilize poultry, beef, catfish, broccoli, and grapes as the food products treated in the method, but it is intended that the treatment of other food products which would not be adversely affected by the treatment process are also intended to be encompassed by the present invention.

EXAMPLES

The microorganisms utilized in the following examples are as follows: Staphylococcus aureus ATCC 29213, Campylobacter jejuni.ATTC 29428, *Escherichia coli* (non-toxin producing strain) ATCC 25922; *Escherichia coli* 0157:H7 (toxin-producing strain) ATCC 43895, Arcobacter butzleri ATCC 49616, *Listeria monocytogenes* ATCC 49594, *Aeromonas hydrophila* ATCC 49140, *Bacillus cereus* ATCC 49063, *Salmonella typhimurium* ATCC 14028 and NCTC 12023, and commercially available cultures of *Aspergillus flavus* and *Penicillium chrysogenum*.

Example 1

Bactericidal Activity of Quaternary Ammonium Compounds in Suspension Cultures (Not attached to meat products)

Minimum Inhibitory Concentration (MIC) of Quaternary Ammonium Compounds

Minimum inhibitory concentrations (MIC) for QAC were determined in Mueller Hinton broth (BBL Microbiology System) using the macrodilution method established by the 1987 National Committee for Clinical Laboratory Standards. Experiments were conducted by 16 hour incubation at 37° C. for Staphylococcus aureus, *Escherichia coli* 0157:H7, Listeria monocytogenes, and *Salmonella typhimurium*. For *Aeromonas hydrophila*, and *Bacillus cereus* incubations were performed at 30° C. MIC were determined by the lowest dilution with no visible turbidity. Table 2 shows the data from the above experiment:

TABLE 2

| | MINIMAL INHIBITORY CONCENTRATION (MIC) | | | | | |
|---|---|---|---|---|---|---|
| Cetylpyridinium chloride, (CPC) µg/mL | Cpc vs E. coli O157:H7 | CPC vs B. cereus | CPC vs S. aureus | CPC vs S. typhimurium | CPC vs A. hydrophila | CPS vs L. monocytogenes |
| 125 | – | – | – | – | – | – |
| 62.5 | – | – | – | – | – | – |

TABLE 2-continued

MINIMAL INHIBITORY CONCENTRATION (MIC)

| Cetylpyridinium chloride, (CPC) µg/mL | Cpc vs E. coli O157:H7 | CPC vs B. cereus | CPC vs S. aureus | CPC vs S. typhimurium | CPC vs A. hydrophila | CPS vs L. monocytogenes |
|---|---|---|---|---|---|---|
| 31.25 | − | − | − | + | + | − |
| 15.63 | − | − | − | + | + | − |
| 7.81  | + | − | − | + | + | − |
| 3.91  | + | + | − | + | + | − |
| 1.96  | + | + | − | + | + | − |
| 0.98  | + | + | − | + | + | − |
| 0.50  | + | + | − | + | + | + |
| 0.25  | + | + | − | + | + | + |
| 0.00  | + | + | + | + | + | + |

(−) No growth (+) Growth
MICs were obtained by the macrodilution broth method (National Committee for Clinical Laboratory Standards).

Minimum Bactericidal Concentration (MIC) of Quaternary Ammonium Compounds

Minimum bactericidal concentrations (MBC) for QAC towards *Campylobacter jejuni* and *Arcobacter butzleri* were determined in Mueller Hinton broth (BBL Microbiology System) using the macrodilution method established by the 1987 National Committee for Clinical Laboratory Standards. Experiments were conducted by microaerophilic incubation at 37° C. for 48 hours. An aliquot of each dilution was pour plated in agar and incubated in microaerophilic conditions at 37° C. for 48 hours. MBCs were determined as the lowest dilution with no growth. Table 3 shows the data from the above experiment:

TABLE 3

MINIMAL BACTERICIDAL CONCENTRATION (MBC)

| Cetylpyridinium Chloride, µg/mL | CPC vs Campylobacter jejuni | CPC vs Arcobacter butzleri |
|---|---|---|
| 125   | − | − |
| 62.5  | − | − |
| 31.25 | − | + |
| 15.63 | − | + |
| 7.81  | − | + |
| 3.91  | + | + |
| 1.96  | + | + |
| 0.98  | + | + |
| 0.50  | + | + |
| 0.25  | + | + |
| 0.00  | + | + |

(−) No growth (+) Growth
MBCs were obtained by the macrodilution broth method (National Committee for Clinical Laboratory Standards).

The MIC and MBC data shows that CPC is effective against a broad range of microorganisms.

Activity of Quaternary Ammonium Compounds in Planktonic Cells

A 16-hour culture of each of *E. coli* O157:H7 in trypti.case soy broth was centrifuged (15,000 rpm, 10 min, 4° C.). After removal of the supernatant, the pellet was washed with 10 ml 0.04M potassium phosphate buffer (PPB, pH 7.0), and suspended in PPB to a final suspension of $1-2 \times 10^9$ cells/ml. Aliquots (1.0 ml) were centrifuged (14,000 rpm, 3 min), and the supernatants were removed. Each pellet was suspended in either 1 ml of an aqueous solution of various concentrations (100–1,000 µg/ml) of test composition (CPC) or 1.0 ml of PPB, vortexed (30 sec), incubated for 1 min at 25° C., and centrifuged (14,000 rpm, 3 min). After removal of the supernatant, each pellet was suspended in 0.5 ml PPB. Cells from each sample were counted using duplicate 0.05 ml aliquots and standard serial dilution techniques on trypticase soy agar, and the data recorded as mean colony-forming units (CFU)/ml.

The results of the above experiment show complete reduction of viable *E. coli* O157:H7 in suspension was achieved at all concentrations of CPC tested (100, 250, 500, and 1000 µg/ml). The results of this experiment are particularly significant for the prevention of cross contamination with *E. coli* O157:H7 in industrial processing of meat. As discussed above, this strain of toxinproducing *E. coli* shows resistance to many broad spectrum antimicrobial agents. These results provide evidence that treatment of meat products with QAC will prevent one contaminated piece of meat from contaminating other uncontaminated pieces because the QAC will kill the organism in the liquid which is the transfer agent responsible for the cross contamination.

Example 2

Effects of Quaternary Ammonium Compounds on the Reduction of Viable Bacteria attached to Chicken Skin Chicken skins (2.5×2.5 cm) excised from a drumstick, sterilized by a 45 KGy dose of irradiation from an electron source, were placed epidermal side up in each well of six-well tissue culture plate. Each skin piece was inoculated with 5 ml 0.008 M phosphate buffered saline (PBS, pH 7.2) containing $6-8 \times 10^3$ CFU/ml bacteria with the exception of the background control group that was treated only with 5 ml of PBS. The plates were incubated (30 min, 35° C.), and each skin piece was rinsed (2×, 5 ml PBS) to remove loosely bound (unattached) microorganisms. Each inoculated skin was treated with 5 ml of PBS containing CPC. Three pieces of skin were used for each concentration of CPC, including one in which the skins were treated only with 5 ml of PBS (0 concentration). The plates were incubated with shaking (100 rpm) for 30 min at 25° C. After incubation, each skin piece was rinsed (5 ml PBS), placed in a sterile plastic bag containing 80 ml of saline or 1% peptone, and homogenized for 2 minutes using a laboratory blender (Stomacher® 400, Seward Medical, London, England). Three aliquots of the homogenate (1 ml) were pour-plated and incubated (37° C., 18–24 hr). Bacterial colonies were counted, corrected for dilution, and reported as CFU/skin.

These studies show the reduction in viable bacteria (*Salmonella typhimurium, Staphylococcus aureus, Campylobacter jejuni, Escherichia coli* (non-toxin producing strain) and *Escherichia coli* 0157:H7) after treatment with 50 to 1000 ppm concentrations of CPC. Higher concentrations of CPC up to 8,000 ppm were tested against *Escherichia coli* 0157:H7 and found to reduce the number of attached bacteria to below 0.1%. These studies show significant inhibition of the growth of these five bacteria on chicken skin.

Example 3

Effects of Quaternary Ammonium Compounds on the Inhibition of Bacterial Attachment to Chicken Skin Chicken skins (2.5×2.5 cm) excised from a drumstick, sterilized by a 45 KGy dose of irradiation from an electron source, were placed epidermal side up in each well of sixwell tissue culture plate. Each skin piece was inoculated with 5 ml 0.008 M phosphate buffered saline (PBS, pH 7.2) containing CPC. Three pieces of skin were used for each concentration of test compound, including one in which the skins were treated only with 5 ml of PBS (0 concentration). The plates were incubated with shaking (100 rpm) for various times (1 min or 10 min) at 25° C. The incubating solution was removed by aspiration, and the skins were rinsed (5 ml PBS), and then incubated 30 min, 35° C. with 5 ml of PBS containing $6-8\times10^3$CFU/ml bacteria. After incubation, each skin piece was rinsed (2×, 5 ml PBS), to remove loosely bound (unattached) microorganisms, placed in a sterile plastic bag containing 80 ml of saline or 1% peptone, and homogenized for 2 minutes using a laboratory blender (Stomacher® 400, Seward Medical, London, England). Three aliquots of the homogenate (1 ml) were pour-plated and incubated (37° C., 18–24 hr). Bacterial colonies were counted, corrected for dilution, and reported as CFU/skin.

These studies show the inhibition of attachment of bacteria (*Salmonella typhimurium, Staphylococcus aureus, Campylobacter jejuni, Escherichia coli* (non-toxin producing strain) and *Escherichia coli* 0157:H7) to chicken skin after treatment with 50 to 1000 ppm concentrations of CPC. The data in these stuides show that pretreating chicken skin with CPC significantly inhibits the attachment of these microorganisms to the chicken skin.

Treating chicken skin with CPC for only 1 minute results in significant inhibition of attachment of *S. typhimurium* at 500 ppm and 1000 ppm. This shorter contact time of QAC with the meat products supports using shorter contact times than have been previously reported as being effective. Generally, chill tank immersions can for up to 60 minutes but the data presented herein supports that a shorter contact or immersion time can be used which still results in significant reduction in the number of viable microorganisms. The contacting step of the present invention can be performed for approximately 20 seconds to about 60 minutes; however, the present invention also discloses a method of a shorter contact time of less than 10 minutes, preferably approximately 20 seconds to about 9 minutes, more preferably approximately 20 seconds to about 5 minutes, and most preferably approximately 20 seconds to about 90 seconds.

Example 4

Effects of Quaternary Ammonium Compounds on the Reduction of Viable Bacteria Attached to Beef Flank Steak Beef flank tissue squares (2.5×2.5 cm) approximately 0.5 cm thick, sterilized by a 45 KGy dose of irradiation from an electron source, were placed in each well of six-well tissue culture plate. Each tissue piece was inoculated with 5 ml 0.008 M phosphate buffered saline (PBS, pH 7.2) containing $6-8\times10^3$CFU/ml bacteria with the exception of the background control group that was treated only with 5 ml of PBS. The plates were incubated (30 min, 35° C.), and each square was rinsed (2×, 5ml PBS) to remove loosely bound (unattached) microorganisms. The inoculated squares were treated with 5 ml of PBS containing the CPC. Three pieces of tissue were used for each concentration of test compound, including one in which the squares were treated only with 5 ml of PBS (0 concentration). The plates were incubated with shaking (100 rpm) for 30 min at 25° C. After incubation, each square was rinsed (5 ml PBS), placed in a sterile plastic bag containing 50 ml of 11% peptone, and homogenized for 2 minutes using a laboratory blender (Stomacher® 400, Seward Medical, London, England). Three aliquots of the homogenate (1 ml) were pour-plated and incubated (37° C., 18–24 hr). Bacterial colonies were counted, corrected for dilution, and reported as CFU/square.

The results of this study show a reduction in viable *Escherichia coli* 0157:H7 after treatment with 50 to 1000 ppm concentrations of CPC on beef flank tissue with 62–64% reduction in attached bacteria at 500 and 1000 ppm CPC.

Example 5

Effects of Quaternary Ammonium Compounds on the Inhibition of Bacterial Attachment to Beef Flank Tissue Beef flank tissue squares (2.5×2.5 cm), approximately 0.5 cm thick, sterilized by a 45 KGy dose of irradiation from an electron source, were placed in each well of six-well tissue culture plate. Each tissue piece was treated with 5 ml 0.008 M phosphate buffered saline (PBS, pH 7.2) containing CPC. Three pieces of beef tissue were used for each concentration of test compound, including one in which the squares were treated only with 5 ml of PBS (0 concentration). The culture plates were incubated with shaking (100 rpm) for 10 minutes at 25° C. The incubating solution was removed by aspiration, and the squares were rinsed (5 ml PBS), and then incubated (30 min, 350° C.) with 5 ml of PBS containing $6-8\times10^3$CFU/ml bacteria. After incubation, each tissue piece was rinsed (2×, 5 ml PBS), to remove loosely bound (unattached) microorganisms, placed in a sterile plastic bag containing 50 ml of 1% peptone, and homogenized for 2 minutes using a laboratory blender (Stomacher® 400, Seward Medical, London, England). Three aliquots of the homogenate (1 ml) were pour-plated and incubated (37° C., 18–24 hr). Bacterial colonies were counted, corrected for dilution, and reported as CFU/square.

The results of this study show the inhibition of attachment of *Escherichia coli* 0157:H7 after treatment with 50 to 1000 ppm of CPC with a 76% reduction in the number of bacteria attached to the beef at concentrations of 1000 ppm CPC. FIG. 1 shows the results of a separate trial using higher concentrations of CPC and the same experimental procedure. At 20,000 ppm CPC, the bacteria was completely inhibited from attaching to beef.

Example 6

Pre-Chill Poultry spraying with 0.1% Cetylpyridinium Chloride

A spraying test chamber was designed and constructed for use in a poultry processing pilot plant. The spraying test system consisted of a testing chamber, a spraying water storage tank, a pressure pump, a filter, pressure regulators, a plastic spraying chamber with eight nozzles located on four sides, and a used water collector. There were three nozzles on each of the pipes for front and back spraying. One nozzle was used for top spraying and one nozzle for bottom spraying. The chamber dimensions preferably are 3×3×3 feet. With a high pressure booster pump, the pressure could be adjusted between 0–140 psi. The distance between the spraying nozzles and the chicken carcass was 12–15 inches. The top nozzle was used to spray the inside of the chicken carcass. Flat-cone spraying nozzles (1/8TK-SS1, Spraying Systems Co.) were used.

The spray solution in the storage tank was pumped to the pressure regulator, and then sprayed through the nozzles in the chamber. In the spraying chamber, several spraying layers consisting of stainless steel nozzles and pipes were installed, and the chamber was covered with plastic sheets to prevent chemical drift. A shackle was used to hang up a chicken carcass in the chamber.

Pre-chill chicken carcasses were obtained from a local poultry processing plant. They were taken from the end of an evisceration processing line, transported to the research laboratory, and immediately used for the tests. The time elapsed between the processing plant and the research laboratory was less than one half hour. The temperature of chicken carcasses was in the range of 32–37° C.

Chicken carcasses were inoculated by spraying 1 ml of S. typhimurium at $1\times10^6$ CFU/ml and then incubated at room temperature for 30 min. The inoculated chicken carcasses were rinsed by spraying tap water at 30 psi and 22° C. for 5 sec. to wash off loosely attached Salmonella cells. Then each carcass was hung in the spraying chamber and sprayed with one of the test compounds. After spraying, each chicken carcass was rinsed with tap water for 20 sec. The chicken carcasses were then washed with buffered peptone water in a plastic bag on an automatic shaker to get samples for microbial analysis. The color of chicken skin was examined visually by comparing the birds treated with test compounds, such as QACs, with untreated birds.

CPC at a concentration of 1000 ppm was used at different spraying pressures and durations. Spraying water temperature was set at room temperature of 22° C. Pressures were set at 30, 50, and 120 psi, and duration at 30 and 90 sec. Three replicates were performed for each trial. Reduction of S. typhimurium on chicken carcasses was compared among test compound sprayed, water sprayed, and non-sprayed groups.

After spraying treatments, each carcass was mechanically shaken with 100 ml of buffered peptone water (BPW) for 1 min, and then the wash water was collected. The samples were diluted, enriched, plated on XLT agar or Petrif ilm (3M,Inc.; St. Paul, Minn. for total aerobic count plates) and incubated for 18–24 hours at 37° C. Then, colony forming units were counted. The number of attached bacteria was calculated using a most-probable-number technique. The most probable numbers of Salmonella and total aerobic plate counts were performed for each carcass using the wash water samples. An analysis of variance was used to analyze the experimental data to determine any significant differences among the treatment groups and controls (SAS/STAT User's Guide, SAS Institute, Inc., Cary, N.C. 199:3).

The results of this experiment show that 30 and 90 second spraying of 1000 ppm solution of CPC at pressures of 30, 50, and 120 psi cause a significant reduction in the number of Salmonella on chicken carcasses. This data shows that the spraying method is a viable alternate method to the standard method of immersion or dipping of chickens when sprayed for 30 seconds to 90 seconds with a pressure in the range of 30 to 120 psi at 0.1% CPC concentration. It may be possible to use lower concentrations of CPC with varying spray pressures within the disclosed range of 30 to 120 or greater psi and varying spray times to obtain the most efficient process which results in significant reduction in the food-borne microorganisms. The spraying method would be advantageous to use in industrial processes because many chicken carcasses could be sprayed automatically for short periods of time and yet result in significant reduction of pathogenic bacteria.

Example 7

Effective Concentration and Time Study of the Effects of Quaternary Ammonium Compounds on S. typhimurium on Chicken Skin The effects of CPC on the inhibition and reduction of viable S. typhimurium on chicken skin were studied. Test solutions comprised various concentrations of CPC (Sigma Chemical Co., St. Louis, Mo.) in 5% (v/v) glycerin in 0.008 M, pH 7.2 phosphate buffered saline (PBS). The solutions were prepared by dissolving the appropriate amounts of CPC in the glycerin-PBS mixture. Skin squares (2.5×2.5 cm) from drumsticks of freshly frozen, unprocessed chickens were sterilized by a 45 kGy dose of irradiation (electron beam from a linear accelerator, Iowa State University) The source of S. typhimurium was ATCC strain # 14028 or NCTC strain # 12023). All colony counts were performed on tryptic soy agar (TSA; DIFCO, Detroit, Mich.) plates. Salmonella storage was on TSA. Inoculum preparation was performed as follows. A flask containing 50 ml tryptic soy broth was inoculated with S. typhimurium from a single colony and then incubated (37° C.) with shaking (150 rpm) overnight. A one ml aliquot of the culture was washed with 9 ml PBS (4800 rpm, 10 min.) two times. The pellet was resuspended in PBS to obtain a final cell concentration (spectrophotometrically, 420 nm) of 1 to $2\times10^6$ colony forming units (CFU) per ml.

Chicken skin was excised from drumsticks and placed epidermal side up in each well of six-well tissue culture plates. Skin pieces were inoculated with 5 ml of PBS containing 1 to $2\times10^6$ CFU of S. typhimurium per ml, with the exception of the background control group that was treated only with 5 ml of PBS. Culture plates with the skin pieces were incubated (30 min, 35° C.), and then the incubating solution was removed by aspiration. The inoculated skins were treated with 5 ml of the test solution. Sets of three pieces of skin were used for each concentration of test solution, including one set in which the skins were treated only with 5 ml of 5% (v/v) glycerin in PBS (0 concentration). The plates were incubated at 25° C. with shaking (100 rpm) for 1, 3, or 10 min. After incubation, each skin piece was rinsed with aspiration (5 ml PBS), placed in a sterile plastic bag containing 50 ml of 0.1% (w/v) peptone, and homogenized for 2 minutes using a Stomacher® 400 laboratory blender (Seward Medical Co., London, England). A corner of the bag was aseptically cut and the entire contents were transferred to a sterile centrifuge tube, which was then spun for 10 min (12,000 rpm, 20° C.). The pellet was resuspended in 5 ml 0.1% (w/v) peptone/water. One ml of the appropriate dilution was pour plated onto TSA agar in triplicate and then incubated at 37° C. for 24 hour, after which colonies were counted, corrected for dilution, and reported as CFU/skin. The results show that Salmonella reduction was dependent upon both CPC concentration and time of exposure. Nearly a 5 $\log_{10}$ decontamination was achieved by treating with CPC solutions of 4000 and 8000 ppm for contact times as low as 3 min.

Skin squares were placed epidermal side up in each well of six-well tissue culture plates. Skin pieces were treated with 5 ml of the test solution. Sets of three pieces of skin were used for each concentration of test solution, including one set in which the skins were treated only with 5 ml of 5% (v/v) glycerin in PBS (0 concentration). Culture plates with the skin pieces were incubated at 25° C. with shaking (100 rpm) for 1, 3, or 10 min. The incubating solution was removed by aspiration, and the skins were rinsed (5 ml PBS) and then incubated (30 min., 35° C.) with 5 ml of PBS containing 1 to $2 \times 10^6$ CFU of *S. typhimurium* per ml. After incubation, each skin piece was rinsed with aspiration (5 ml PBS), placed in a sterile plastic bag containing 50 ml of 0.1% (w/v) peptone, and homogenized for 2 minutes using a Stomacher® 400 laboratory blender. Three aliquots of the homogenates (1 ml) were pour-plated onto TSA agar and incubated at 37° C. for 24 h and then colonies were counted, corrected for dilution, and reported as $\log_{10}$ CFU/skin. The results indicate that prevention of Salmonella contamination by pretreatment with CPC also showed concentration and time dependency. The most marked effects were observed for 10 minute pretreatment times where a 4.9 $\log_{10}$ inhibition of Salmonella attachment was shown at a concentration of 8,000 ppm. This result is important since prevention of cross-contamination is of paramount importance in food processing.

Values of $\log_{10}$ CFU/skin for controls were within the range 4.61 to 5.03. Differences between treated samples and controls were analyzed using ANOVA followed by NewmanKeuls multiple range analysis and were statistically significant ($p<0.01$).

In another spraying experiment, a 3.3 $\log_{10}$ reduction of Salmonella was obtained after a 90 second spraying of chicken carcasses with a 5,000 ppm solution of CPC.

Example 8

Effects of Quaternary Ammonium Compounds on the Reduction of viable Listeria monocytogenes attached to Chicken Skin The steps of Example 2 were followed except that *L. monocytogenes* was used to inoculate the chicken skin and the media in the plastic bag used in the Stomacher 400 contained 0.1% peptone. At concentrations of CPC of 2000 ppm or higher, there was greater than a 4 $\log_{10}$ reduction in *L. monocytogenes*.

Example 9

Effects of Quaternary Ammonium Compounds on the Inhibition of Attachment of viable Listeria monocytogenes attached to Chicken Skin The steps of Example 3 were followed except that *L. monocytogenes* was used to inoculate the chicken skin and the media in the plastic bag used in the Stomacher 400 contained 0.1% peptone. The results of this study show a reduction of 82% of attached bacteria at 50 ppm, reduction of 92% at 100 ppm, and reduction of 100% at 500 and 1000 ppm.

Example 10

Effects of Quaternary Ammonium Compounds on the Reduction of viable Salmonella typhimurium attached to Catfish, Black Grapes, and Broccoli The effects of CPC on the reduction of viable *S. typhimurium* on catfish, black grapes, and broccoli were studied. Test solutions comprised various concentrations of CPC (Sigma Chemical Co., St. Louis, Mo.) in 5% (v/v) glycerin in 0.008 M, pH 7.2 phosphate buffered saline (PBS). The solutions were prepared by dissolving the appropriate amounts of CPC in the glycerin-PBS mixture.

Food samples were small intact mushrooms, small intact black grapes, broccoli florets, and catfish skin squares (2.5× 2.5 cm) excised from unprocessed, freshly thawed catfish. The fruit and vegetables were purchased from a local grocery, while the fish was shipped frozen from a lbcal catfish supplier. The source of *S. typhimurium* was ATCC strain # 14028 or NCTC strain # 12023).

All colony counts were performed using Salmonellaselective XLD agar (DIFCO, Detroit, Mich.) plates. Additionally, in the catfish experiments, total aerobic colony counts were performed using a non-selective medium, tryptic soy agar (TSA:DIFCO, Detroit, Mich.). Salmonella storage was on TSA.

Figure 2:
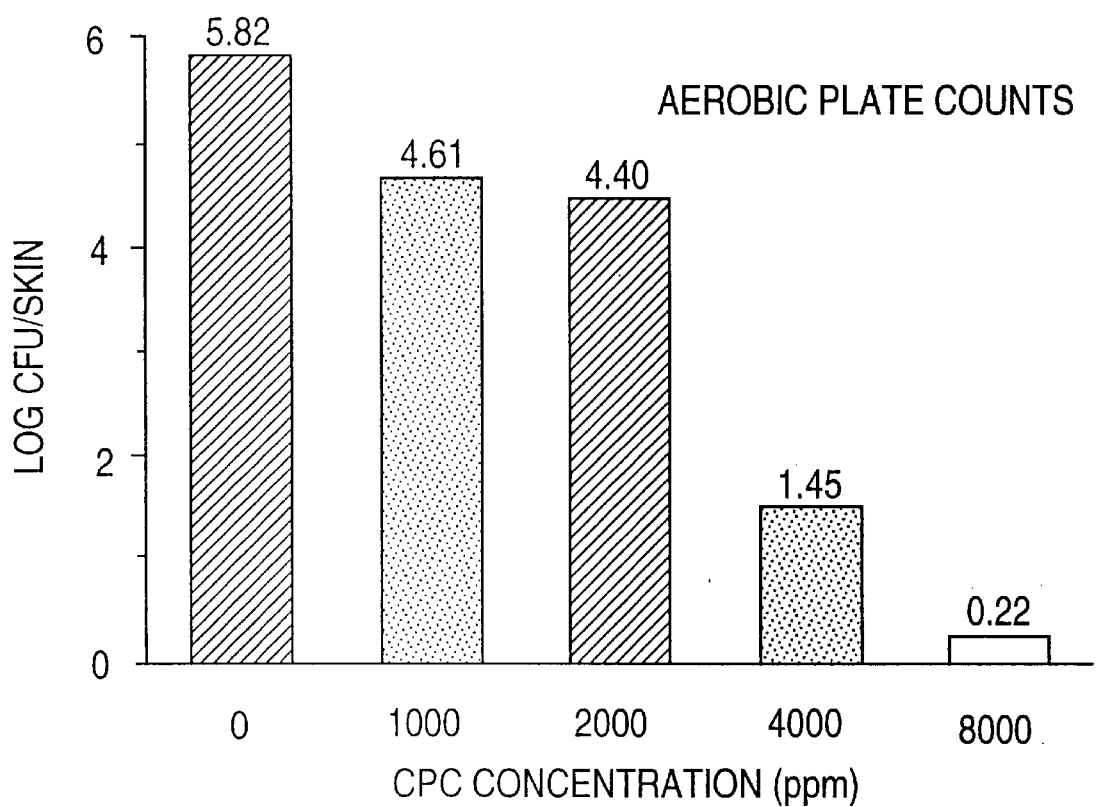
FIG. 2 is a bar graph showing the reduction of viable microorganisms on catfish skin after treatment with CPC in 5% aqueous glycerin on non-selective media.
Figure 3:
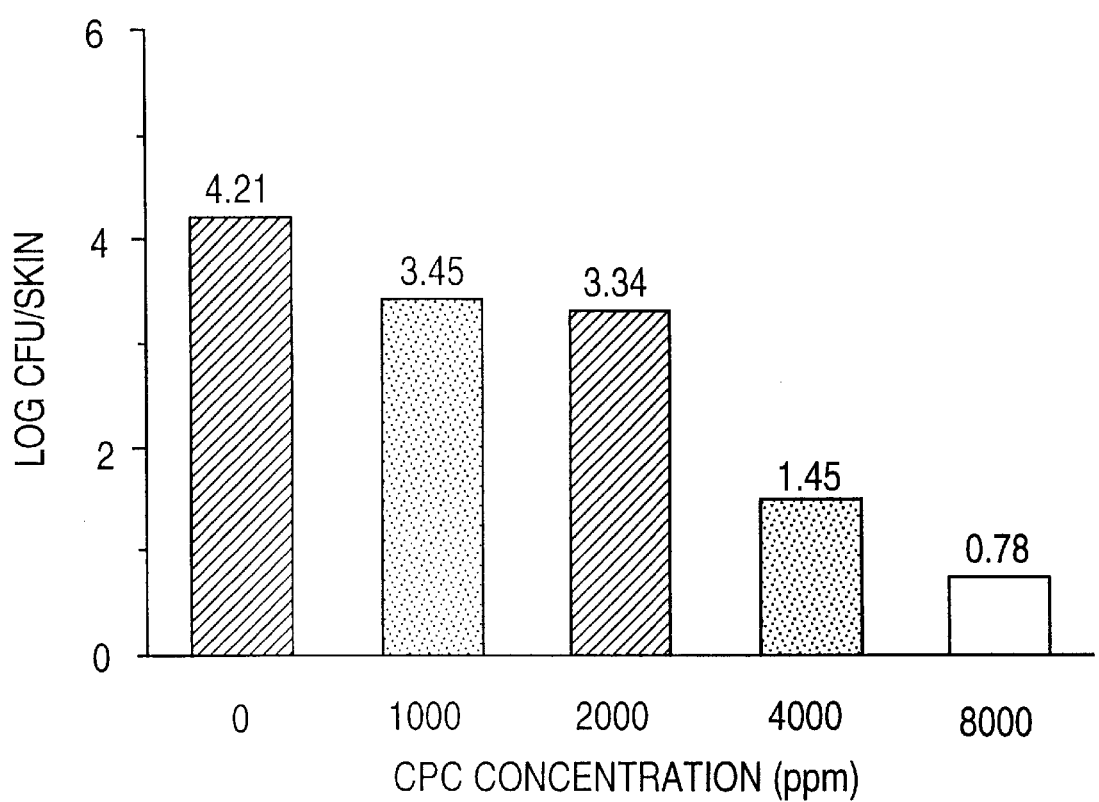
FIG. 3 is a bar graph showing the reduction of viable *S. typhimurium* on catfish skin after treatment with CPC in 5% aqueous glycerin on selective media.
Figure 4:
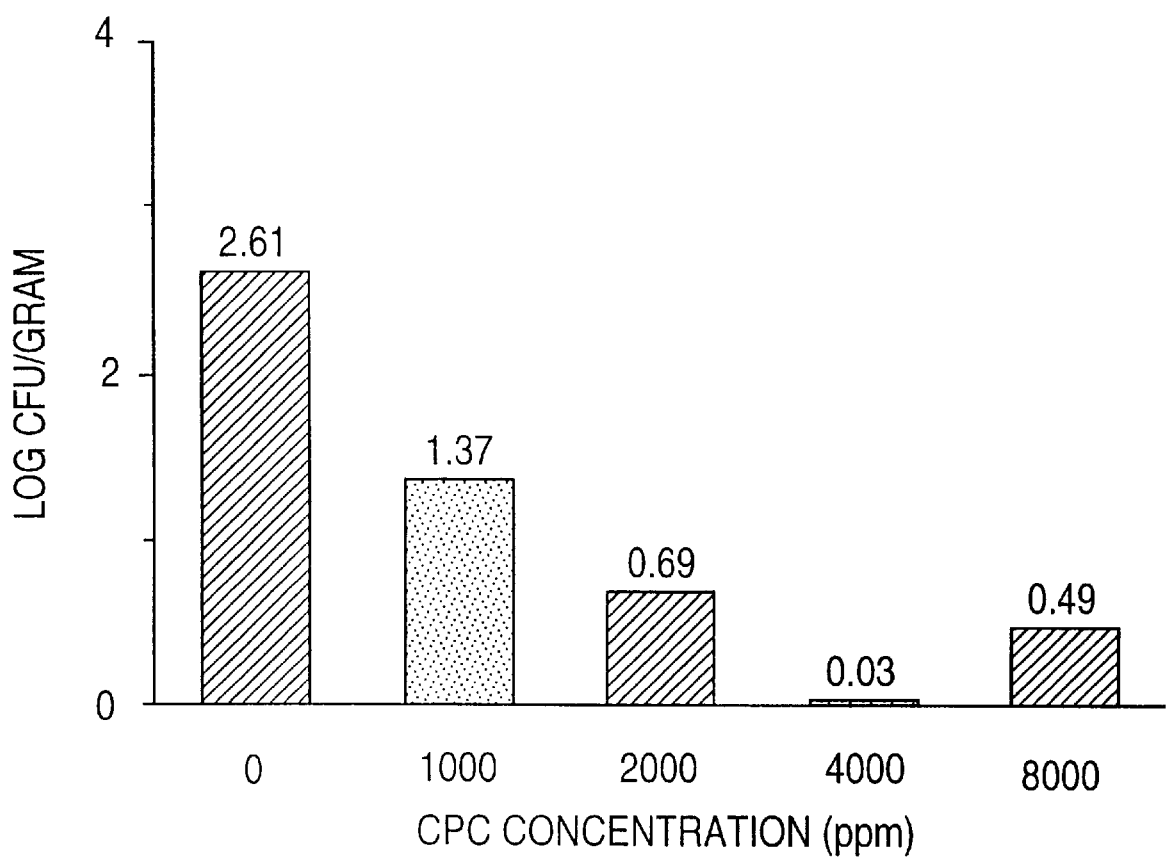
FIG. 4 is a bar graph showing the reduction of viable *S. typhimurium* on black grapes after treatment with CPC in 5% aqueous glycerin.
Figure 5:
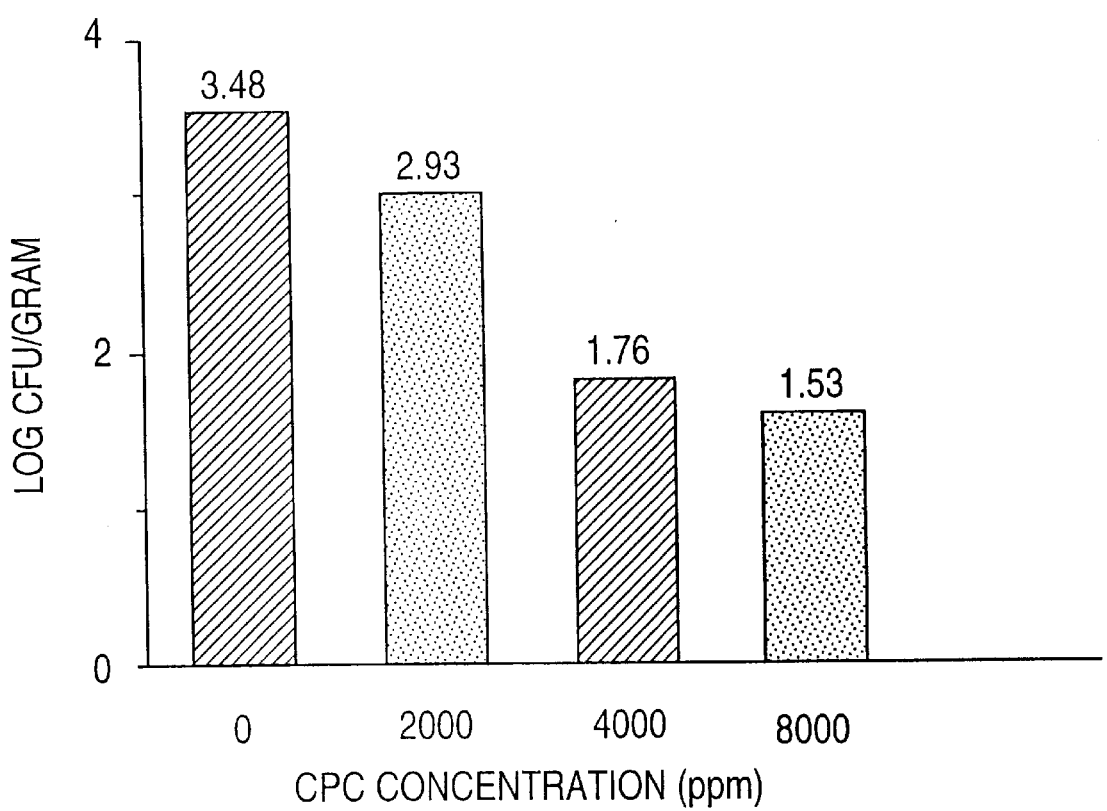
FIG. 5 is a bar graph showing the reduction of viable *S. typhimurium* on broccoli after treatment with CPC in 5% aqueous glycerin.

Inoculum preparation for *S. typhimurium* was performed as described in Example 7 above. Food samples were placed in each well of six-well tissue culture plates. The samples were then inoculated with 5 ml of PBS containing 1 to $2 \times 10^6$ CFU of *S. typhimurium* per ml, with the exception of the background control group that was treated only with 5 ml of PBS. Culture plates with the food samples were incubated (30 min., 35° C.), and then the incubating solution was removed by aspiration. The inoculated samples were treated with 5 ml of the test solution. Sets of three food samples were used for each concentration of test solution, including one set in which the food samples were treated only with 5 ml of 5% (v/v) glycerin in PBS (0 concentration). The plates were incubated at 25° C. with shaking (100 rpm) for 3 min. After incubation, each food sample was prepared and placed in a plastic bag for use with the Stomacher® 400 laboratory blender as described in Example 7 above. A corner of the bag was aseptically cut and the entire contents were transferred to a sterile centrifuge tube, which was then spun for 10 min (12,000 rpm, 20° C.). The pellet was resuspended in 5 ml 0.1% (w/v) peptone/water. One ml of the appropriate dilution was pour plated onto XLD agar for the grape and broccoli experiments and onto both XLD and TSA agar for the catfish in triplicate. After incubation at 37° C. for 24 hour, colonies were counted, corrected for dilution, and reported as CFU/skin for catfish and as CFU/gram for the other food samples. The results of these experiments are shown in FIGS. 2–5. As the catfish were not irradiated, FIG. 2 shows the total aerobic bacterial count on non-selective media whereas FIG. 3 shows only Salmonella counts.

Example 11

Effect of Spraying Quaternary Ammonium Compounds on the Reduction of Viable Bacteria on Whole Chickens These experiments tested the effect that spraying QACs on whole chicken carcasses using a commercial sprayer would have on the reduction of viable bacteria. The bacterial inoculating solutions were made as follows: *E. coli* (ATTC # 25922) was grown in brain heart infusion broth (BHI) for 20–24 h and then diluted to a 1:1000 concentration by adding 0.5 ml of *E. coli* culture to 500 ml of physiological saline solution (PSS). *S. typhimurium* was grown in BHI for 20–24 h and then diluted to a 1:5000 concentration by adding 0.1 ml of *S. typhimurium* culture to 500 ml of physiological saline solution (PSS). The CPC treatment solution was prepared to a concentration of 5,000 ppm.

Prechill chicken carcasses were obtained from a local poultry processing plant for each trial. The carcasses were placed on a shackle line and 1 ml of the bacterial inoculating solution was sprayed on the breast of the carcass, and 1 ml was sprayed on the back. The bacteria were allowed to attach for 30 min at room temperature. After attachment the carcasses were rinsed on the shackle line with tap water for 20 seconds. The carcasses were divided into groups of ten. For each run, there was a group of ten chickens that were sprayed with only tap water but for *S. typhimurium*, there was also a group that was not sprayed after inoculation to evaluate the effect of the spray.

For all of the bacteria, one group of carcasses were treated with the Johnson™ washer for 20 seconds at 60 psi with 35 cups of tap water. After the rinse, the carcasses were allowed to set for 90 seconds, and then rinsed with 20 cups of tap water for 20 seconds at 80 psi. This rinse cycle was repeated either two or three times. The interval of each rinse was also 90 seconds. Another group of carcasses were treated with 5,000 ppm CPC for 20 seconds at 60 psi in the Johnson™ washer, then allowed to set for 90 seconds, and then rinsed with 20 cups of tap water for 20 seconds at 80 psi. This rinse cycle was repeated either two or three times.

After treatment the carcasses were placed in plastic bags and 100 ml of 0.1% buffered peptone water (BPW) was added to each bag. The bags were mechanically shaken and the rinse collected for most probable number (MPN) technique. Petrifilm™ was also employed for evaluation of total aerobic plate counts (TPC). Preexisting (not inoculated) *C. jejuni* was enumerated by the MPN technique and *E. coli* by Petrifilm™.

The results presented below show that the CPC treatment is effective in reducing the number of *C. jejuni*, *E. coli*, and *S. typhimurium*. The wash water for the *S. typhimurium* runs were tested and it was found that CPC in the wash water reduced the Salmonella by 1 log. Thus, the kill data presented below for Salmonella can be reduced by 1 log.

| BACTERIA PRESENT | | | | |
|---|---|---|---|---|
| | | Water Control | 5,000 ppm CPC | Reduction in $Log_{10}$ |
| *C. jejuni* | Trial 1 | 2.613 | 0 | 2.613 |
| | Trial 2 | 2.643 | 0.629 | 2.014 |
| *E. coli* | Trial 1 | 1.974 | 0.386 | 1.588 |
| | Trial 2 | 1.380 | 0.460 | 0.920 |

| | | | | Reduction in $Log_{10}$ CFUs | |
|---|---|---|---|---|---|
| *S. typhimurium* | No Spray Control | Spray Control | 5,000 ppm CPC | No Spray vs. CPC Treatment | Spray vs. CPC Treatment |
| 1 (12/02/96) | 5.342 | 5.039 | 4.295 | 1.047 | 0.744 |
| 2 (12/09/96) | 5.304 | 4.932 | 1.977 | 3.327 | 2.955 |
| 3 (12/16/96) | 5.001 | 5.154 | 2.606 | 2.395 | 2.548 |
| 4 (01/27/97) | 4.72 | 4.48 | 1.03 | 3.69 | 3.45 |
| 5 (02/03/97) | 4.185 | 4.212 | 1.426 | 2.76 | 2.79 |

Example 12

Effect of Quaternary Ammonium Compounds on Foodborne Fungi

This study tested the effect of CPC on foodborne fungi. Slant cultures of *Aspergillus flavus* and *Penicillium chrysogenum* were streaked onto a potato dextrose agar (PDA) plates. Thirty minutes after inoculation or 24 h after inoculation (and incubation at room temperature, two round filters (7 mm in diameter) were put on the surface of each plate. CPC solutions of 200 ppm, 1000 ppm, 5000 ppm, and 25,000 ppm or distilled and deionized (DD) water were added to the filters, 10 µl per filter. All plates were incubated lid side up at room temperature for 48 hours. The diameters of the inhibition rings were measure. The results presented below show that CPC is effective against foodborne fungi.

| | Inhibition Ring (mm) | |
|---|---|---|
| Concentration of CPC (ppm) | Immediate Treatment | Delayed Treatment |
| Effect of CPC on *Aspergillus flavus* 2 | | |
| 25,000 | 1.53 | 1.00 |
| 5,000 | 2.00 | 0.92 |
| 1,000 | 0.38 | 1.00 |
| 200 | 0.25 | 0.33 |
| 0 | 0 | 0 |
| Effect of CPC on *Penicillium chrysogenum* | | |
| 25,000 | 4.13 | 1.83 |
| 5,000 | 3.38 | 1.92 |
| 1,000 | 1.00 | 1.67 |
| 200 | 0 | 1.17 |
| 0 | 0 | 0 |

CPC is effective against foodborne fungi tested.

Formulations of Quaternary Ammonium Compounds

When using a composition in an industrial process, it is preferable to work with only small volumes of liquid concentrates rather than large volumes of liquid solutions. A formulation of QAC has been developed that allows QAC concentrations up to 1000-fold greater than those presently available in formulation made in water alone. This formulation which contains at least one solubility enhancing agent provides a soluble concentrate for easy dilution to the final concentration for use in large scale industrial processing. The solubility enhancing agent functions to maintain the solubility of the QAC so that it does not precipitate out of solution. Any compatible solubility agent can used but ethyl alcohol or glycerin are preferred. The formulation can contain ethyl alcohol, glycerin or both. This formulation contains approximately 100,000 ppm to about 300,000 ppm QAC, approximately 0% to about 49% ethyl alcohol and approximately 0 to about 20% glycerin in water. A preferred formulation contains approximately 150,000 ppm to about 250,000 ppm QAC, approximately 10% to about 40% ethyl alcohol and approximately 0.5 to about 10% glycerin in water. More preferably, the ethyl alcohol concentration can range from approximately 15% to about 30% and the glycerin concentration can range from approximately 0.5 to about 5%. Preferably, this formulation contains approximately 200,000 ppm QAC, approximately 20% ethyl alcohol, and approximately 1% glycerin. This formulation is particularly useful as a concentrate to be added to the storage tanks for use in immersion treatment of food products with QAC but it is also useful in a spraying method at a final concentration of approximately 5,000 ppm QAC.

A second formulation was developed to increase the contact time of a QAC solution on food products during processing, particularly when delivered by a spraying method. This formulation potentially allows a longer contact time of the QAC with the product without any additional steps which would increase the processing time. The formulation by virtue of its properties potentially increases the antimicrobial effectiveness of the process. This formulation preferably contains approximately 50 ppm to about 20,000 ppm QAC, and at least one of a solubility enhancing agent selected from approximately 0 to about 10% ethyl alcohol, and approximately 0 to about 20% glycerin or both. More preferably this formulation contains approximately 50 ppm to about 5,000 ppm, approximately 0 to about 10% ethyl alcohol, and approximately 1.0% to about 10% glycerin in water. Most preferably this formulation contains approximately 500 ppm to about 5,000 ppm QAC, 0 to 10% ethyl alcohol, and approximately 1.0 to about 5% glycerin in water and more preferably approximately 1.0 to about 3% glycerin.

The foregoing description of the preferred embodiments of the present invention was presented for illustrative purposes and not meant to limit the invention to specific compositions used in the examples because various modifications to the disclosed invention are possible in light of the above teachings. The present invention is based upon the discovery that QAC significantly prevents and reduces bacterial contamination by a broad spectrum of foodborne microbial contamination than was previously known. The invention is intended to cover alternatives, modifications and equivalents, which may be included within the spirit and scope of the invention as defined by the appended claims.

We claim:

1. A method for preventing the growth of microorganisms other than Salmonella on meat products other than poultry comprising:

contacting said meat product other than poultry with a microbial growth inhibiting effective amount of a quaternary ammonium compound for about 20 seconds to about less than 10 minutes to prevent the growth of microorganisms other than Salmonella on said meat product, wherein said quaternary ammonium compound is selected from the group consisting of an alkylpyridinium salt represented by the structural formula (I):

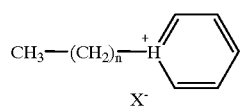

(I)

wherein n is 9–21, and X is a halide;

a tetra-alkylammonium salt represented by the structural formula (II):

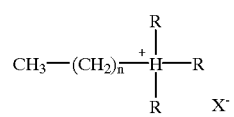

(II)

wherein n is 9–21, and R is selected from the group consisting of CH₃ and C₂H₅, and X is a halide; and an alkylalicyclic ammonium salt represent by the structural formula (III):

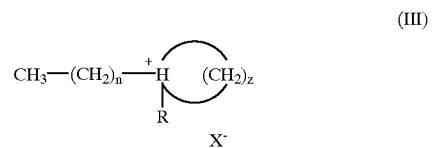

(III)

wherein n is 9–21, Z is 4–5, R is selected from the group consisting of CH₃ and C₂H₅, and X is a halide.

2. The method of claim 1, wherein said microorganisms are bacteria, fungi, or parasites.

3. The method of claim 2, wherein said bacteria are selected from the group consisting of Staphylococcus, Campylobacter, Arcobacter, Listeria, Aeromonas, Bacillus, non-toxin producing Escherichia, and pathogenic toxin-producing Escherichia.

4. The method of claim 3, wherein said pathogenic toxin-producing Escherichia is *Escherichia coli* 0157:H7.

5. The method of claim 1, wherein said quaternary ammonium compound is an alkylpyridinium salt.

6. The method of claim 5, wherein said alkylpyridinium salt is cetylpyridinium chloride.

7. The method of claim 1, wherein said microbial growth inhibiting effective amount of quaternary ammonium compound ranges from about 50 to about 20,000 parts per million.

8. The method of claim 1, wherein said microbial growth inhibiting effective amount of quaternary ammonium compound ranges from about 500 to about 5,000 parts per million.

9. The method of claim 1, wherein said contacting comprises immersing said meat product into said quaternary ammonium compound.

10. The method of claim 1, wherein said contacting comprises spraying said meat product with said quaternary ammonium compound.

11. The method of claim 1, further comprising determining the presence of said quaternary ammonium compound on said meat product after said contacting step.

12. A method for preventing the growth of microorganisms on seafood, vegetables or fruit products comprising:

contacting said seafood, vegetables, or fruit products with a microbial growth inhibiting effective amount of a quaternary ammonium compound for a sufficient period of time to prevent the growth of microorganisms on said seafood, vegetables, or fruit products, wherein said quaternary ammonium compound is selected from the group consisting of an alkylpyridinium salt represented by the structural formula (I):

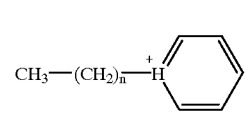

(I)

wherein n is 9–21, and X is a halide;

a tetra-alkylammonium salt represented by the structural formula (II):

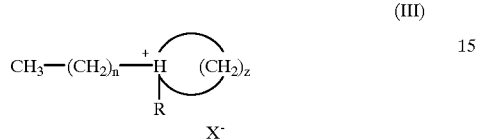
(II)

wherein n is 9–21, and R is selected from the group consisting of $CH_3$ and $C_2H_5$, and X is a halide; and an alkylalicyclic ammonium salt represent by the structural formula (III):

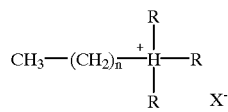
(III)

wherein n is 9–21, Z is 4–5, R is selected from the group consisting of $CH_3$ and $C_2H_5$, and X is a halide.

13. The method of claim 12, wherein said microorganisms are bacteria, fungi, or parasites.

14. The method of claim 13, wherein said microorganisms are selected from the group consisting of Salmonella, Staphylococcus, Campylobacter, Arcobacter, Listeria, Aeromonas, Bacillus, non-toxin producing Escherichia, pathogenic toxin-producing Escherichia, Aspergillus, Penicillium, and *Entamoeba histolytica*.

15. The method of claim 14, wherein said pathogenic toxin producing Escherichia is *Escherichia coli* O157:H7.

16. The method of claim 12, wherein said quaternary ammonium compound is an alkylpyridinium salt.

17. The method of claim 16, wherein said alkylpyridinium salt is cetylpyridinium chloride.

18. The method of claim 12, wherein said microbial growth inhibiting effective amount of quaternary ammonium compound ranges from about 50 to about 20,000 parts per million.

19. The method of claim 18, wherein said microbial growth inhibiting effective amount of quaternary ammonium compound ranges from about 500 to about 5,000 parts per million.

20. The method of claim 12, wherein said contacting comprises immersing said seafood, vegetable or fruit product in said quaternary ammonium compound.

21. The method of claim 12, wherein said contacting comprises spraying said seafood, vegetable, or fruit product with said quaternary ammonium compound.

22. The method of claim 21, wherein said sufficient period of contact time ranges from about 20 seconds to about 10 minutes.

23. The method of claim 12, further comprising determining the presence of said quaternary ammonium compound on said food product after said contacting step.

24. The method of claim 1, wherein said meat product is beef, pork, lamb or venison.

25. A method for preventing the growth of a pathogenic toxin-producing Escherichia on meat products comprising:

contacting said meat product with a microbial growth inhibiting effective amount of quaternary ammonium compound for a sufficient period of time to prevent the growth of a pathogenic toxin-producing Esherichia on said meat product, wherein said quaternary ammonium compound is selected from the group consisting of an alkylpyridinium salt represented by the structural formula (I):

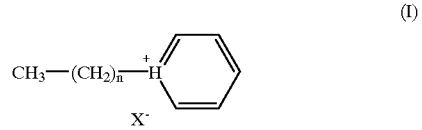
(I)

wherein n is 9–21, and X is a halide;

a tetra-alkylammonium salt represented by the structural formula (II):

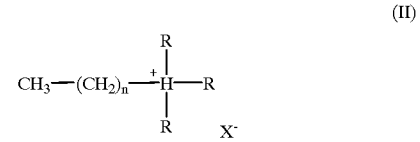
(II)

wherein n is 9–21, and R is selected from the group consisting of $CH_3$ and $C_2H_5$, and X is a halide; and an alkylalicyclic ammonium salt represent by the structural formula (III):

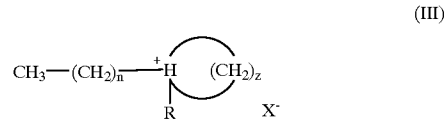
(III)

wherein n is 9–21, Z is 4–5, R is selected from the group consisting of $CH_3$ and $C_2H_5$, and X is a halide.

26. The method of claim 25, wherein said pathogenic toxin-producing Escherichia is *Escherichia coli* O157:H7.

* * * * *

UNITED STATES PATENT AND TRADEMARK OFFICE
CERTIFICATE OF CORRECTION

PATENT NO.   : 6,039,992
DATED        : March 21, 2000
INVENTOR(S)  : Cesar Compadre et al.

It is certified that error appears in the above-identified patent and that said Letters Patent is hereby corrected as shown below:

Column 7,
Line 11, please delete the following formula:     and insert therefor:

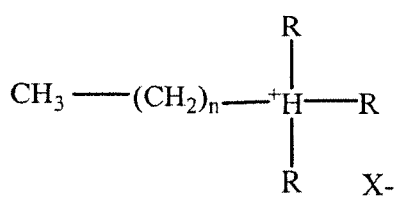  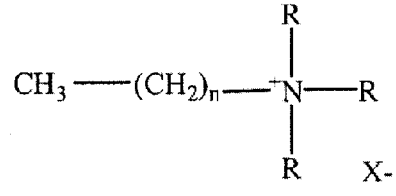

Line 25, please delete the following formula:
                                          and insert therefor:

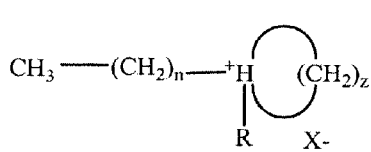  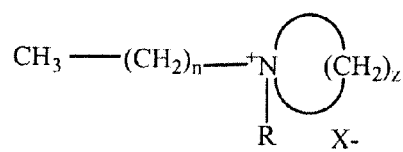

Column 19,
Line 46, please delete the following formula:
                                          and insert therefor:

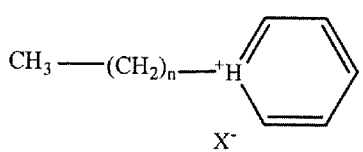  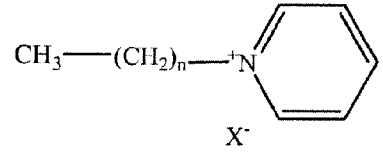

Line 56, please delete the following formula:     and insert therefor:

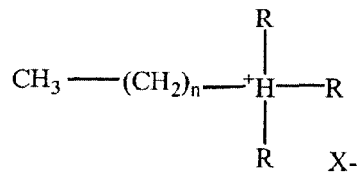  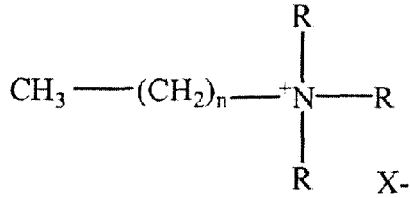

Column 20,
Line 3, please delete the following formula:
                                          and insert therefor:

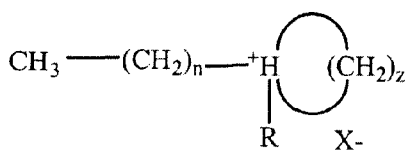  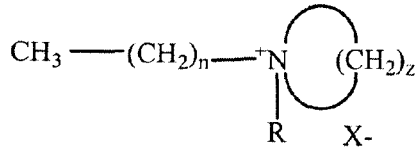

UNITED STATES PATENT AND TRADEMARK OFFICE
CERTIFICATE OF CORRECTION

PATENT NO. : 6,039,992
DATED : March 21, 2000
INVENTOR(S) : Cesar Compadre et al.

It is certified that error appears in the above-identified patent and that said Letters Patent is hereby corrected as shown below:

Column 20 cont'd,
Line 56, please delete the following formula: and insert therefor:

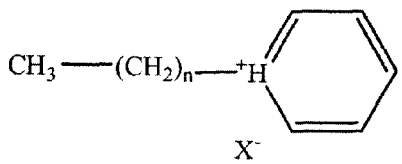 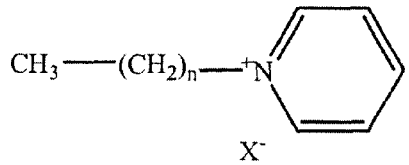

Column 21,
Line 3, please delete the following formula: and insert therefor:

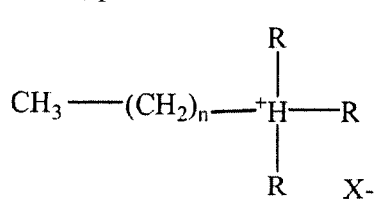 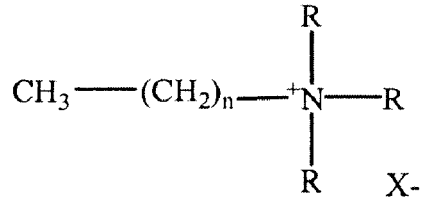

Line 14, please delete the following formula: and insert therefor:

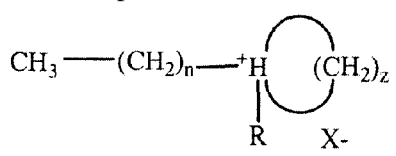 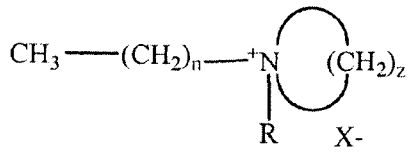

Column 22,
Line 17, please delete the following formula: and insert therefor:

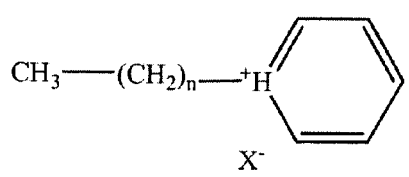 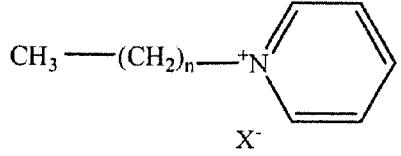

Line 31, please delete the following formula: and insert therefor:

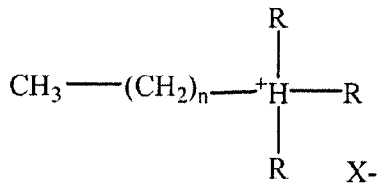 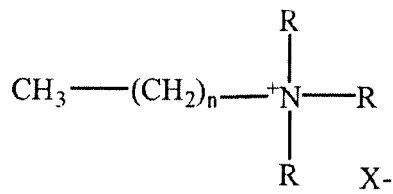

UNITED STATES PATENT AND TRADEMARK OFFICE
CERTIFICATE OF CORRECTION

PATENT NO. : 6,039,992
DATED : March 21, 2000
INVENTOR(S) : Cesar Compadre et al.

It is certified that error appears in the above-identified patent and that said Letters Patent is hereby corrected as shown below:

Column 22 cont'd,
Line 43, please delete the following formula: and insert therefor:

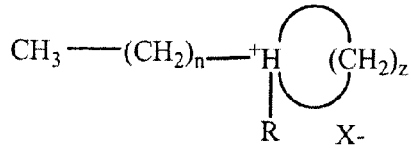 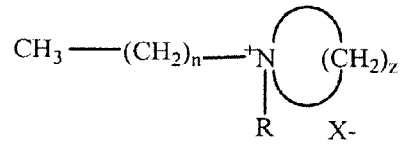

Signed and Sealed this

Twenty-sixth Day of August, 2003

JAMES E. ROGAN
*Director of the United States Patent and Trademark Office*